United States Patent [19]
Myneni et al.

[11] Patent Number: 5,477,692
[45] Date of Patent: Dec. 26, 1995

[54] METAL SPONGE FOR CRYOSORPTION PUMPING APPLICATIONS

[75] Inventors: Ganapati R. Myneni, Yorktown; Peter Kneisel, both of Williamsburg, Va.

[73] Assignee: Southeastern Universities Research, Newport News, Va.

[21] Appl. No.: 251,798

[22] Filed: May 31, 1994

[51] Int. Cl.[6] .................................................. B01D 8/00
[52] U.S. Cl. ...................................... 62/55.5; 417/901
[58] Field of Search ................................ 62/51.1, 55.5; 417/901

[56] References Cited

U.S. PATENT DOCUMENTS

| | | | |
|---|---|---|---|
| 3,990,816 | 11/1976 | Kohler et al. | 417/536 |
| 4,300,360 | 11/1981 | Chanin et al. | 62/51.3 |
| 4,439,269 | 3/1984 | Cukauskas | 156/643 |
| 4,956,337 | 9/1990 | Ogushi | 505/1 |
| 5,039,657 | 8/1991 | Goldman et al. | 505/1 |
| 5,070,702 | 12/1991 | Jackson | 62/51.3 |
| 5,244,556 | 9/1993 | Inoue | 204/192.12 |
| 5,330,855 | 7/1994 | Semancik et al. | 428/701 |
| 5,343,740 | 9/1994 | Myneni | 73/40.7 |

Primary Examiner—Ronald C. Capossela

[57] ABSTRACT

A system has been developed for adsorbing gases at high vacuum in a closed area. The system utilizes large surface clean anodized metal surfaces at low temperatures to adsorb the gases. The large surface clean anodized metal is referred to as a metal sponge. The metal sponge generates or maintains the high vacuum by increasing the available active cryosorbing surface area.

20 Claims, 4 Drawing Sheets

METAL SPONGE FOR CRYOSORPTION PUMPING APPLICATIONS

The United States may have certain rights to this invention, under Management and Operating Contract DE-AC05-84ER40150 from the United States Department of Energy.

FIELD OF THE INVENTION

This invention relates to systems for adsorbing gases at high vacuum in a closed area, and particularly, to the use of large surface clean anodized metal at low temperatures to adsorb the gases. The large surface clean anodized metal is referred to as a metal sponge. The metal sponge generates or maintains the high vacuum by increasing the available active cryosorbing surface area.

BACKGROUND OF THE INVENTION

It is sometimes desired to maintain an enclosed space at ultra high vacuum (UHV). Pressures below $10^{-10}$ torr can be achieved by cryosorption pumping of $H_2$ and He in liquid helium cooled clean vacuum systems. Low pressures such as these are now commonly maintained by adsorbing the He and $H_2$ with molecular sieves and activated carbon. However, molecular sieves and activated carbon have several drawbacks in this application including low pumping speed and the introduction of unwanted particulates to the enclosed system.

Molecular sieves and activated carbon have a physical structure in which pores are available for trapping He and $H_2$. However, their pumping speed is limited because the pores are long and the gas molecules, once they enter the pore, block the whole pore area. The active area available for adsorption is therefore reduced and not much is available for further adsorption. The molecular sieve or activated carbon must then be taken to high temperatures to relieve the block, and this interrupts the ultra high vacuum.

Molecular sieves and activated carbon have the disadvantage of introducing unwanted particulates into the vacuum system. The particulates can make it impossible to develop a clean vacuum as is required in many applications. Activated carbon and molecular sieves are also difficult to dry completely and therefore contain a lot of water. This makes it very difficult to use molecular sieves and activated carbon to achieve very low pressures, such as $10^{-10}$ torr. If one could dry the molecular sieves or activated carbon completely then they would be effective for very low pressures, but drying them completely is a very difficult thing to do.

SUMMARY OF THE INVENTION

The invention consists of the use of metal sponges which, as used in this disclosure and claims, are metals with a porous unsealed anodized surface such as anodized aluminum or anodized niobium which have anodic coatings with increased active surface area for the adsorption of $H_2$ or He or other gases from a system. The metal sponge is a metal substrate that has been treated, usually electrically, in an appropriate bath to build up a porous oxide surface. The anodized surfaces of this disclosure are very porous oxides that adhere in integral fashion to the metal substrate and the pores provide a large surface area of an activity such that it readily adsorbs gas molecules. The surface of the anodized metal is unsealed, to allow the gas molecules a path to the porous structure within. The pores in the anodized coating of this disclosure are a series of deep valleys with steep side walls. When adsorbing gases, the physical structure of the metal sponges do not have the propensity to cause blocking, as do the molecular sieves and activated carbons, therefore allowing gas molecules access to the inner structure which has a large surface area for adsorption of the gases. Pressures below $10^{-10}$ torr can be maintained for prolonged periods of time by increasing the available active surface area of the cryosorbing surfaces with these metal sponges. The metal sponges can provide the required surface area increase for higher adsorption capacities as well as for enhancing the pumping speed of the gases.

The metal sponges of this invention will find use in any application in which it is desired to generate or maintain a stable vacuum, such as cryopumps, cryosorption pumps, cryovacuum systems, particle accelerators, etc. They can also be used in cryostats as combination radiation shields and gas adsorber for stopping the thermal radiation from going to the lower temperature parts and at the same time adsorb the residual gases at different temperatures. They can also be used as appendages in cryogenic containers for pumping the residual gases so that the cryogen will be retained for a very long time.

DESCRIPTION OF THE INVENTION

This invention consists of the use of metal sponges to generate or maintain a particulate free vacuum in a low pressure and low temperature range by adsorbing gases and especially $H_2$ or He that have built up by either the outgassing of $H_2$ from the vacuum components or He leaks in the system.

Figure 1:
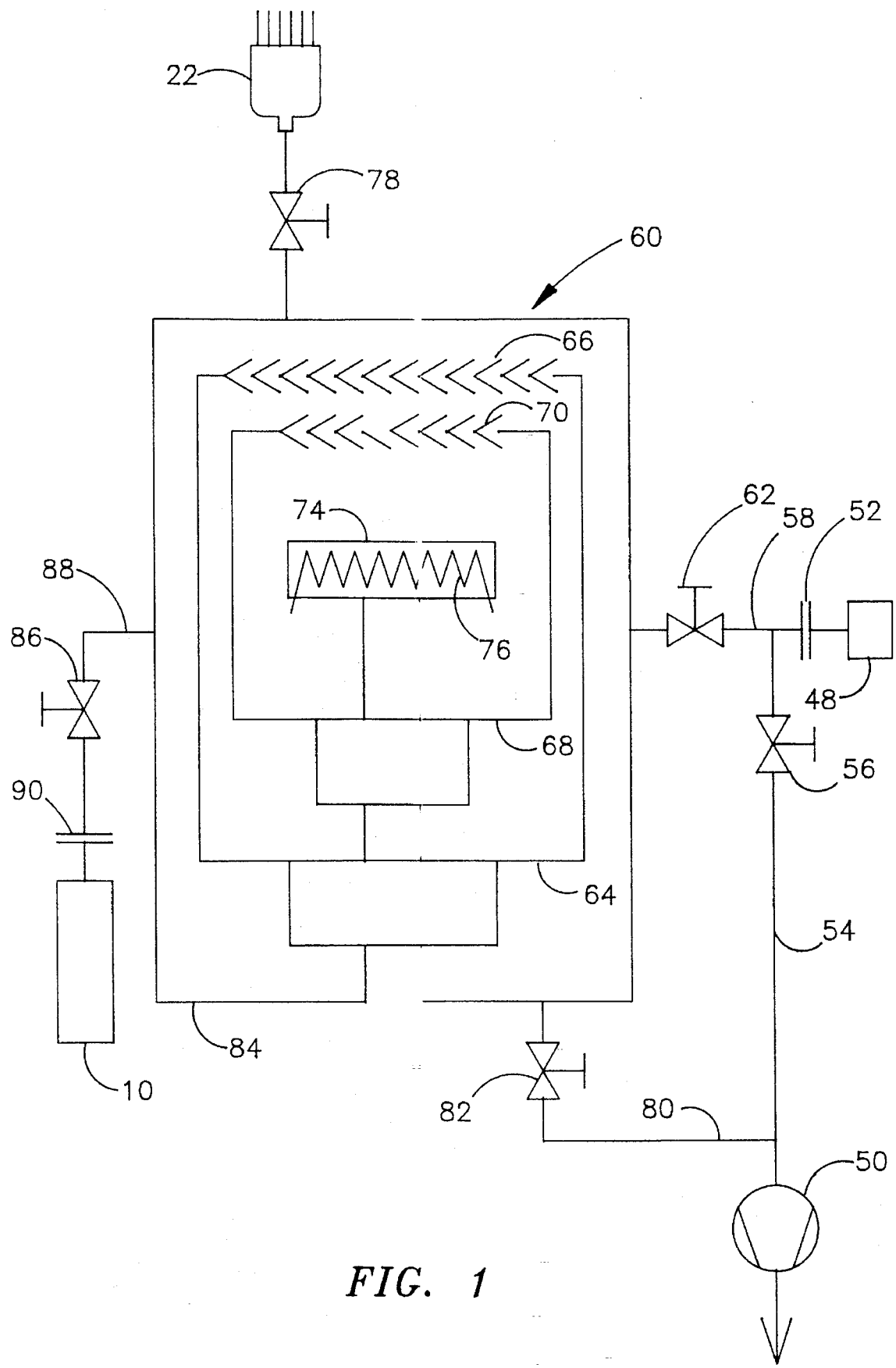
FIG. 1 is a schematic of a leak detector including a multi stage cryo-cooler.

FIG. 1 shows a schematic representation of a leak detector containing a multi stage cryo-cooler similar to FIG. 1 of copending U.S. Pat. No. 5,343,740 issued Sep. 5, 1994 by one of the same inventors and owned by a common assignee. This application is incorporated into this disclosure by reference.

For the leak detector depicted in FIG. 1, a test piece 48 is connected to a mechanical vacuum pump 50 through a connector 52, a vacuum line 54, and a valve 56. The test piece 48, which is usually in the form of an enclosed vessel such as a wave guide or the like, is surrounded by a bag into which helium is introduced in the well known manner. The bag may alternately be a metallic container or other similar arrangement and the helium that leaks through the test piece to its inside, which is held at vacuum pressures, is what is measured to determine leakage. Alternately, the test piece can have helium inside and a surrounding vessel held at vacuum pressures so its leaking helium escapes from the inside of the vessel to the surrounded evacuated chamber.

A vacuum line 58 connects the test piece to a module which is preferably a cryopump 60 through a valve 62. The cryopump 60 nests a sequence of cold surfaces or shields which have decreasing temperatures. Each shield employs metal sponges consisting of anodized aluminum, anodized niobium, or some similar anodized metal to adsorb any residual gases condensible at the particular temperature maintained by each shield. For each shield, the metal sponges are in the shape of baffles which are the last surfaces the gases contact prior to moving to the next stage.

The first stage or shield 64, is held at approximately 70K, at which temperature water vapor, carbon monoxide, carbon dioxide, and other gases with freezing points of 70 K and higher freeze onto the surface. This is called pumping since the gases are in effect pumped from the surrounding atmosphere. Those remaining gases migrate through the 70K metal sponge baffles 66, of the first shield 64.

Any gases that have freezing points lower than 70K move through the 70K metal sponge baffles 66 and on to the second shield 68, which is cooled to a temperature of approximately 20K, where hydrogen, nitrogen, oxygen, etc. freeze out onto the surfaces. The 20K metal sponge baffles 70 of the second shield 68 is maintained at the same temperature as the second shield and serves to adsorb hydrogen. Thus substantially all of the gases in the atmosphere in the cryopump have been removed or scavenged except for helium.

A metal sponge plate 74 may be used instead of a copper plate. It contains a heater 76 and is cycled for predetermined periods between 7.5° K to 9° K or lower and approximately 13° K. At 7.5° to 9° K, the metal sponge plate 74 adsorbs/freezes the helium from the atmosphere. When the heater is turned on to raise the metal sponge plate 74 to approximately 13° K, the helium is desorbed/gasified and, in the gaseous state, passes through valve 78 located in a conduit between cryopump 60 and the residual gas analyzer (RGA) 22. The RGA is used to measure the helium. The metallic surface is cooled back down by the source of cooling provided by the cooled scavenger module.

The vacuum pump 50, may be connected through vacuum line 80, to the cryopump 60 through valve 82. The RGA 22 is a typical mass spectrometer type. A preferred RGA sensor is Type PPT-050EM available from the MGS Division of MKS Instruments, Inc., 24 Walpole Park South, Walpole, Ma. 02081 or the EXM Series from Extrel Mass Spectrometry, 575 Epsilon Dr., Pittsburgh, Pa. 15238. When used to sense the leaking helium the active volume primarily is the RGA test unit and cryopump as the other components of the system are closed off through various valves such as valves 56 and 82.

When operating the leak detector of FIG. 1, the cryocooler is maintained in a vacuum vessel 84, which is maintained at room temperature on the exterior. Valves 62 and 82 are closed and valve 56 is opened so that when the test piece 48 is connected it may be evacuated by mechanical pump 50 through vacuum line 54 and open valve 56. It is evacuated by the mechanical pump 50, to $10^{-5}$ Torr. The mechanical pump 50 may be a standard molecular drag pump or an ion pump or a combination of the two. A preferred pump is a TSD020 Molecular Drag Pump Station available from Balzers, 8 Sagamore Park Road, Hudson, N.H. 03051.

After the vacuum has been achieved valve 56 is closed and valve 62 and valve 78 are opened. The test piece 48 is bagged (bag not shown) and helium is introduced to the exterior of the test piece inside the bag. The vacuum in the test piece causes the surrounding helium to leak through any leaks into the interior of the test piece and the cryopump 60.

The cryo-cooler has had its various stages previously cooled. The first stage 64 and its metal sponge baffles 66 have been cooled to 70K. The second stage 68 and its metal sponge baffles 70 have been cooled to 20K. The metal sponge plate 74 hag been cooled to 7.5 to 9° K or lower. The valve 78 between the RGA and cryopump 60 is open. Under these conditions the $H_2O$, $CO$, $CO_2$, and other gases that freeze at 70K or higher will freeze out on the first stage shield especially at the metal sponge baffles 66. The remaining gases,i except for helium, which primarily are $H_2$, $N_2$, and $O_2$ freeze out or adsorb on the second stage shield 68 and metal sponge baffles 70 which are maintained at approximately 20K. Thus all of the gases other than helium are frozen or adsorbed out of the system by the first stage and second stage shields and baffles.

As another alternative, the outer shield 64 can be eliminated and only a single stage shield 68 maintained at approximately 30° K. This shield pumps $H_2$, and the top part of the baffle held at 30K pumps $N_2$, $O_2$, $H_2O$, $CO$, $CO_2$, etc. The cryopump is maintained at its low temperatures by well known methods using liquid helium which is not shown in FIG. 1.

For high sensitivity leak detection as disclosed in U.S. application Ser. No. 08/113,718, the metal sponge plate 74 is cooled to its low temperatures by liquid helium which is not shown. The metal sponge plate 74, when initially maintained at 7.5 to 9K or lower adsorbs/freezes the helium at the surface of the metal sponge plate 74 and this adsorption is permitted to continue for a predetermined period of time, for example one minute. Then the metal sponge plate 74 is heated by the heater 76 to approximately 12K at which point the helium desorbs or gasifies off of the metal sponge plate 74 and migrates to the RGA where the partial pressure thereof is indicated. The helium desorption takes place for approximately one minute and then the metal sponge plate 74 is again cooled to 7.5 to 9K or lower for approximately one minute to adsorb the helium and then again heated to approximately 12K for one minute to desorb/gasify the helium. This cycle is repeated for a desired number of times; at least five times and usually approximately ten times. The length of the cycle of adsorption and desorption can be changed as appropriate and the number of cycles can likewise be changed. The longer the test period and the longer the integration time and accumulation of helium, the more sensitive is the leak test.

Figure 2:
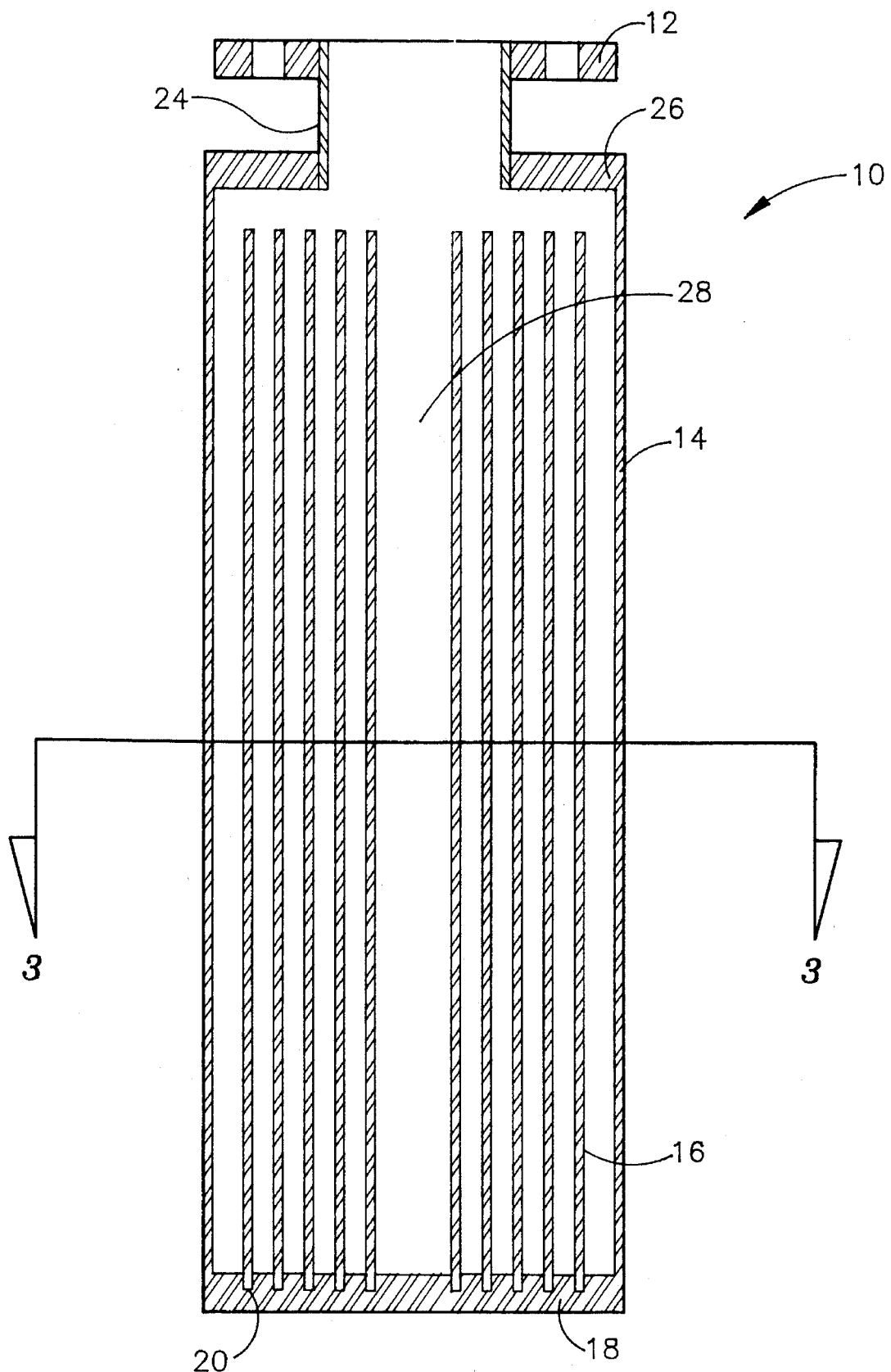
FIG. 2 is a schematic of an adsorption device containing metal sponges in the form of concentric cylinders.
Figure 4:
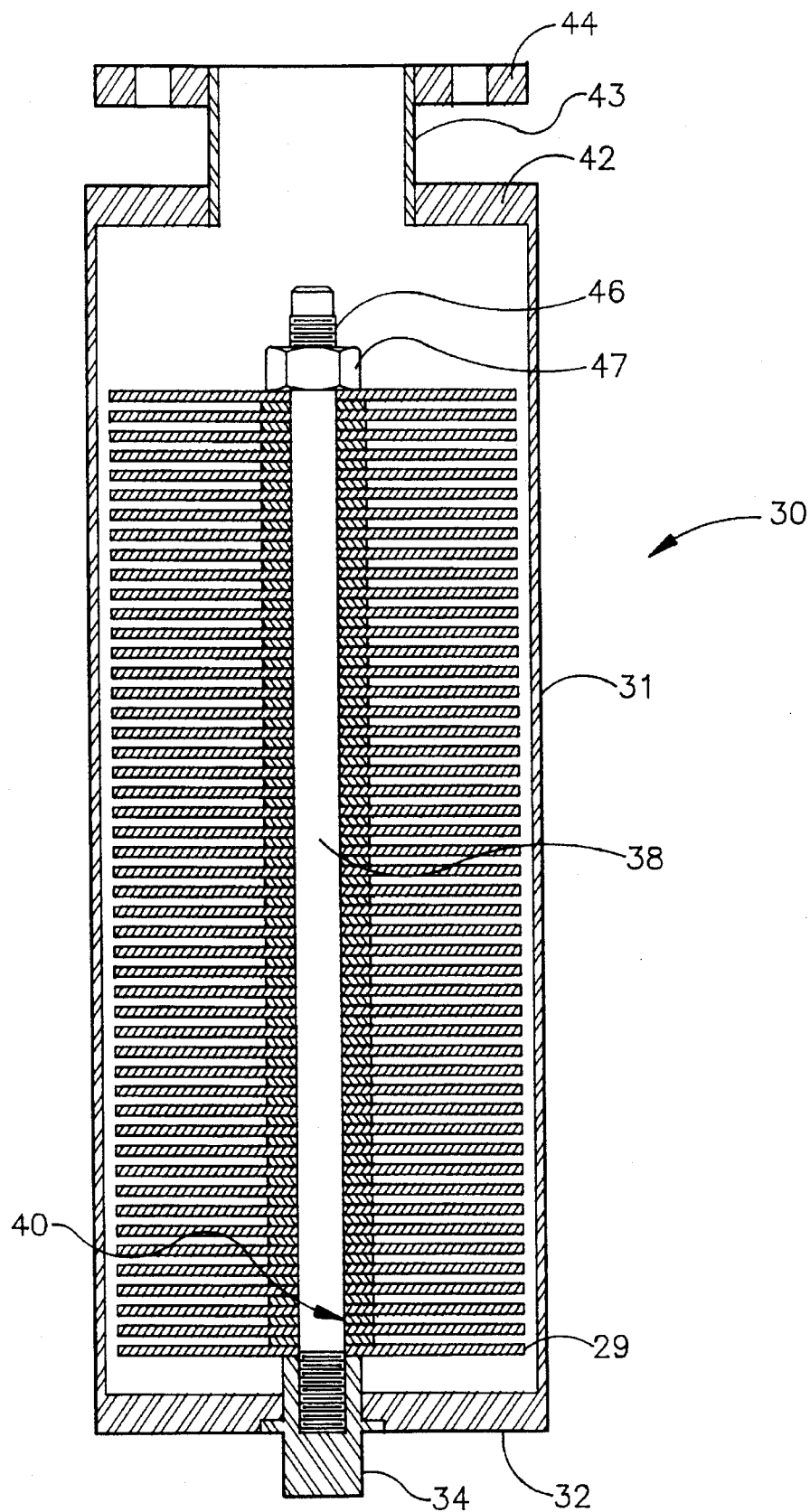
FIG. 4 is a schematic of a small adsorption device containing metal sponges in the form of disks.

FIG. 1 also shows an auxiliary adsorption device 10 that may be a pump such as shown in FIGS. 2 and 4 which can be used to augment cryopump 60 in the adsorption of gases. The auxiliary adsorption device 10 is connected to the multi stage cryopump 60 through vacuum line 88, valve 86 and flange 90.

In operation, valve 86 may be opened after the multi stage cryopump 60 has been used to draw a vacuum on the test piece 48. The auxiliary adsorption unit 10, which has been cooled to a desired temperature, will then have metal sponge surfaces within the unit exposed to the vacuum within the cryopump 60, thus adsorbing additional gases.

With reference to FIG. 2, there is shown a small adsorption pump 10 which can be used to evacuate a small chamber from ambient pressure to about $10^{-2}$ torr or lower or used as an attachment to other cryogenic evacuated spaces. The adsorption pump 10 consists of an outer cylindrical wall 14 having a base 18 integral with the wall 14 and closing off one end of the cylinder and a top 26 integral with the wall 14 and partially closing off the opposite end with a circular passageway therethrough. A cylindrical necked portion 24 extends from and is connected to the top 26. A flange 12 is connected to the necked portion 24. The cylindrical wall 14, top 26 and base 18 define a chamber 28 in which a plurality of concentric adsorption cylinders 16 are fitted into a grooved recess 20 in the base 18. The concentric adsorption cylinders 16 are metal sponges constructed of porous anodized aluminum, porous anodized niobium, or similar anodized metal.

In operation, the small adsorption pump 10 of FIG. 2 will be connected via flange 12 to a system that needs to be evacuated. The adsorption pump 10 including the concentric adsorption cylinders 16 may be evacuated, typically with a rough pump such as a diaphragm pump, and cooled to 77K with liquid nitrogen. The mechanical diaphragm pump may be omitted. A valve (not shown) will then be opened connecting the adsorption pump 10 to the system that needs to be evacuated and thereby causing the adsorption pump 10 to pump out the CO, $CO_2$, $N_2$, $O_2$ and other gases having freezing points above 77K and lowering the pressure to approximately $10^{-2}$ torr. The adsorption pump 10 can later be heated and vented to desorb the gases which had been adsorbed by the metal sponge surfaces. The cycle can then be repeated by closing the valve to the adsorber pump, evacuating the chamber with the diaphragm pump, cooling to 77K, and then opening the valve to pump all of the gases into the adsorber pump until they are adsorbed.

A typical adsorption unit 10 such as depicted FIG. 2 would be about 10 inches in length and contain concentric metal sponges having 9.5 inches of exposed surface in length. Five cylinders having diameters of 1.25", 1 75", 2.25", 2.75", and 3.25" would be enclosed within the unit. The cylinders and the inside surface of the wall 14 of the unit would be metal sponge material giving approximately 783 square inches of exposed metal sponge area.

Figure 3:
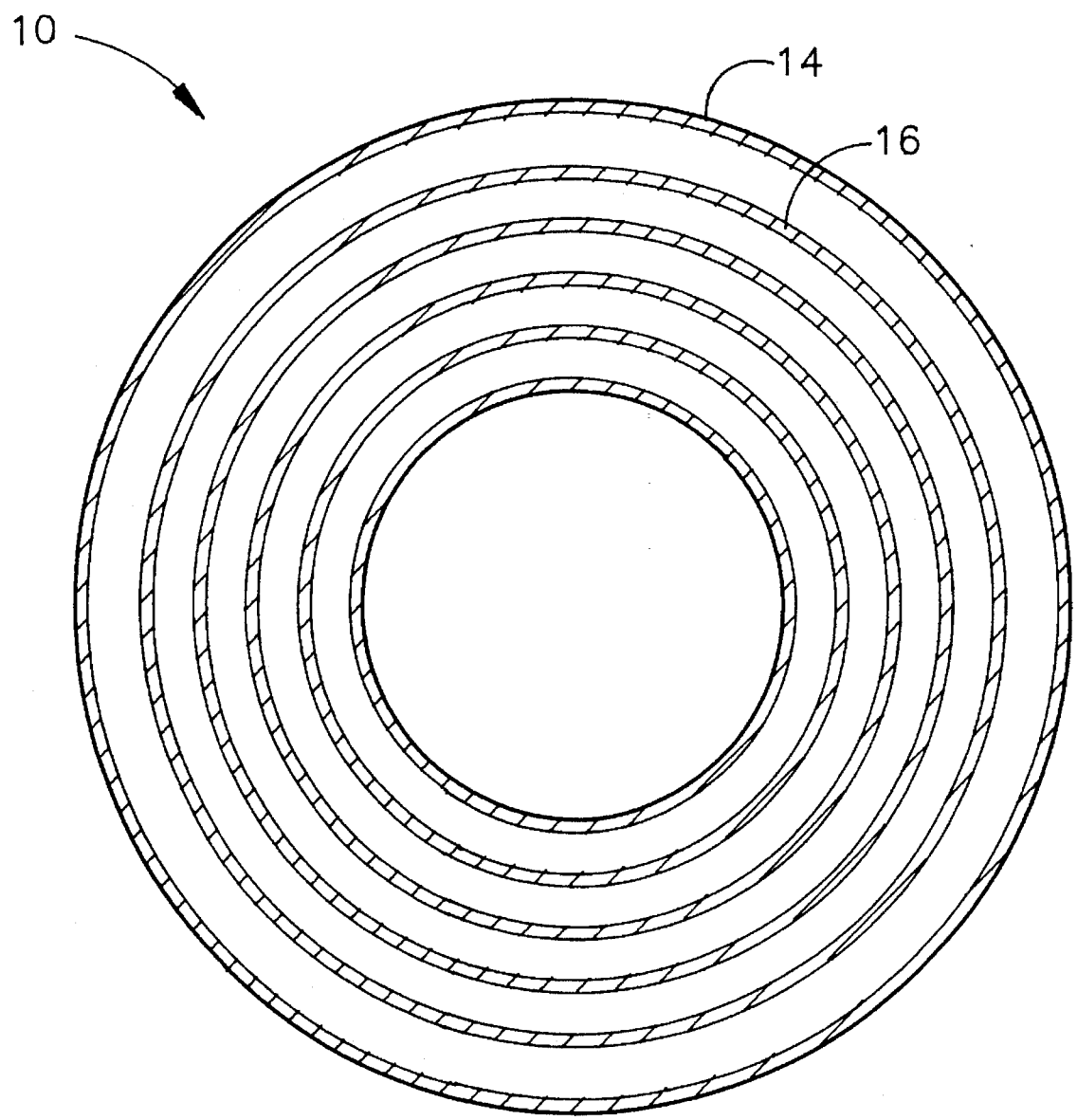
FIG. 3 is a view of a cutaway section of the small adsorption device of FIG. 2 taken along line 3—3 of FIG. 2 and showing the metal sponges in the shape of concentric cylinders.

FIG. 3 is a view taken along line 3—3 of FIG. 2 showing the wall 14 and the concentric metal sponges 16 housed within the adsorbtion unit 10. The concentric sponges 16 are constructed of preferably aluminum with both sides anodized. Alternately the concentric sponges 16 may be constructed of anodized niobium or similar such anodized clean metals.

FIG. 4 is a metal sponge adsorber very similar to the adsorber of FIG. 2, except the metal sponge devices are in the form of stacked disks instead of concentric cylinders. FIG. 4 shows the adsorber unit 30 having a cylindrical wall 31, a bottom flange 32 and a top flange 42. The bottom flange 32 has a recessed area in which a copper plug 34 has been fitted. The copper plug 34 has threaded into it an aluminum rod 38. The aluminum rod 38 has a series of metal sponge disks 29 stacked on the rod 38 and held apart by spacers 40. A threaded Section 46 and nut 47 affixed at the top of the aluminum rod 38 provides a means for securing the disks 29 and spacers 40. A flange 44 is affixed integrally to the necked portion 43 of the adsorption unit to allow means for connecting the unit to the enclosed system that it will work upon. The flanges 32, 42, 44, wall 31, and necked portion 43 of the adsorber unit are typically constructed of 304 stainless steel.

In operation, the copper plug 34 is cooled to liquid nitrogen temperature (77K) or cooler and the excellent thermal conduction properties of the copper lower the temperature of the aluminum rod 38 and the metal sponge disks 29. A valve (not Shown) is opened allowing the metal sponge disks 29 to adsorb any gases adsorbable at the temperature of the disks. The pump is especially usable for $H_2$ or He if sufficiently cooled.

An adsorber unit such as that shown in FIG. 4 may have an overall length of about 10 inches. The disks 29 would typically have an outer diameter of approximately 3.75 inches and the spacers 40 would typically have an outer diameter of approximately 1.2 inches. This arrangement would provide approximately 20 square inches of exposed surface per disk 29, both sides of the disk being available to adsorb gases. A typical adsorption unit 30 as shown in FIG. 4 would contain 49 disks therefore providing approximately 971 square inches of total exposed metal sponge surface for adsorbing gases.

Both unsealed anodized aluminum and niobium have been tested as metal sponges. Metal sponges of anodized aluminum were prepared by anodizing 1100 series aluminum alloy in a sulfuric acid bath, 15% by weight, for about 2 hours at a voltage 12 to 14 volts with a current density of 10 $mA/cm^2$ and a temperature between room temperature and 28° C. At these conditions the aluminum oxide layer was estimated to be between 40 and 50 micrometers ($\mu m$). The anodic coating was porous and left unsealed. Adsorption isotherms on the anodized aluminum were measured at 4.3K and the capacities at the lower pressure range of $10^{-12}$ torr are very high, making unsealed anodized aluminum a very good adsorber at very low pressures for hydrogen and helium.

Metal sponges of unsealed anodized niobium were prepared by anodizing niobium in an ammonium hydroxide bath, 10% by weight, at a voltage of 100 volts with a current density of 1 $mA/cm^2$ and at room temperature. At these conditions the niobium oxide layer was estimated to be about 4000 Angstroms. The anodic coating was porous and left unsealed. Adsorption isotherms on the anodized niobium were measured at 4.3K and the capacities at the lower pressure range of $10^{-12}$ torr is very high, making unsealed anodized niobium a very good adsorber at very low pressures for hydrogen and helium. The anodized aluminum and anodized niobium metal sponges can also adsorb other gases like $N_2$, CO, and $CO_2$ at higher temperatures.

The metal sponges of this invention are usable for adsorbing gases at low temperatures from spaces at less than ambient pressures in many different systems either by attaching as an auxiliary device to the spaces or using as the structural walls of the spaces or adding to the inside of the spaces.

While there has been shown described what is at present considered the preferred embodiment and alternative embodiments of the present invention, it will be obvious to those skilled in the art that various changes and modifications may be made therein without departing from the scope of the invention as defined by the appended claims.

What is claimed is:

1. A cryogenic vacuum system comprising:
   a space enclosure adapted to be reduced in pressure to below ambient pressure and reduced in temperature to liquid nitrogen temperature or lower;
   a source of vacuum for said space enclosure; and
   one or more metal sponges located in communication with said space enclosure for absorbing substantial amounts of gases from said space enclosure.

2. The cryogenic vacuum system of claim 1 wherein said metal sponges are constructed of unsealed anodized aluminum.

3. The cryogenic vacuum system of claim 1 wherein said metal sponges are constructed of unsealed anodized niobium.

4. The cryogenic vacuum system of claim 1 wherein said space enclosure is a cryopump.

5. The cryogenic vacuum system of claim 4 wherein said metal sponges are located at one or more locations within said cryopump.

6. The cryogenic vacuum system of claim 4 wherein said space enclosure containing said metal sponges is located external to said cryopump.

7. The cryogenic vacuum system of claim I wherein said metal sponges are part of a separate enclosure connected to said space enclosure.

8. The cryogenic vacuum system of claim 1 wherein said metal sponges act as a reflector in a cryostat for stopping thermal radiation from going to lower temperature parts.

9. A method for creating or maintaining a particulate free vacuum having very low pressure comprising the steps of:

providing a sealed space having a vacuum of very low pressure; and providing one or more metal sponges in communication with said space at liquid nitrogen or lower temperature whereby gases are adsorbed from said space.

10. The method of claim 9 wherein said metal sponges are constructed of unsealed anodized aluminum.

11. The method of claim 9 wherein said metal sponges are constructed of unsealed anodized niobium.

12. The method of claim 10 wherein said metal sponges are located within said space.

13. The method of claim 12 wherein said metal sponges are in the shape of concentric cylinders.

14. The method of claim 12 wherein said metal sponges are in the form of stacked disks.

15. The method of claim 9 also comprising the steps of:

providing an evacuated enclosure external to but connected in a vacuum tight manner to said sealed space;

providing a passageway between said space and said enclosure;

providing a means for opening and closing said passageway between said space and said enclosure; and opening said closure means between said space and said enclosure allowing said metal sponges within said enclosure to adsorb any gases remaining in said space.

16. A cryogenic vacuum apparatus comprising:

a container enclosing a space adapted to be reduced in pressure to below ambient pressure and reduced in temperature to liquid nitrogen temperature or lower;

one or more metal sponges held inside said container;

a source of vacuum for said space enclosure; and an opening in said container through which gas may enter to be adsorbed by said metal sponges when they are cooled to liquid nitrogen or colder temperatures.

17. An apparatus as in claim 16 wherein said metal sponges are unsealed anodized aluminum.

18. An apparatus as in claim 17 wherein said metal sponges are in the shape of concentric cylinders.

19. An apparatus as in claim 17 wherein said metal sponges are in the shape of stacked disks.

20. An apparatus as in claim 16 wherein said metal sponges are unsealed anodized niobium.

* * * * *